US012581499B2

(12) United States Patent
Muruganathan et al.

(10) Patent No.: US 12,581,499 B2
(45) Date of Patent: Mar. 17, 2026

(54) SYSTEMS AND METHODS FOR UPDATING ACTIVE TCI STATE FOR MULTI-PDCCH BASED MULTI-TRP

(71) Applicant: Telefonaktiebolaget LM Ericsson (publ), Stockholm (SE)

(72) Inventors: Siva Muruganathan, Stittsville (CA); Sebastian Faxér, Stockholm (SE); Helka-Liina Määttänen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 17/767,943

(22) PCT Filed: Oct. 12, 2020

(86) PCT No.: PCT/IB2020/059573
§ 371 (c)(1),
(2) Date: Apr. 11, 2022

(87) PCT Pub. No.: WO2021/070160
PCT Pub. Date: Apr. 15, 2021

(65) Prior Publication Data
US 2023/0199793 A1     Jun. 22, 2023

Related U.S. Application Data

(60) Provisional application No. 62/914,133, filed on Oct. 11, 2019.

(51) Int. Cl.
*H04W 72/231* (2023.01)
*H04W 72/1273* (2023.01)
(52) U.S. Cl.
CPC ..... *H04W 72/231* (2023.01); *H04W 72/1273* (2013.01)

(58) Field of Classification Search
None
See application file for complete search history.

(56) References Cited

U.S. PATENT DOCUMENTS 10,849,187 B2 * 11/2020 Tsai ..................... H04W 80/02
11,617,195 B2 * 3/2023 Huang ................. H04L 5/0048
370/329

(Continued)

FOREIGN PATENT DOCUMENTS

WO     2019138499 A1     7/2019

OTHER PUBLICATIONS

Author Unknown, "Technical Specification Group Radio Access Network; NR; Physical layer procedures for data (Release 15)," Technical Specification 38.214, Version 15.7.0, 3GPP Organizational Partners, Sep. 2019, 105 pages.

(Continued)

*Primary Examiner* — Xavier S Wong
(74) *Attorney, Agent, or Firm* — Sonoda & Kobayashi Intellectual Property Law; Darren M. Gardner

(57) ABSTRACT

Systems and methods for updating an active Transmission Configuration Indicator (TCI) state for multi-Physical Downlink Control Channel (PDCCH) based Multi-Transmission Reception Point (TRP) are provided. In some embodiments, a method performed by a wireless device for receiving one or more, TCI states includes: receiving a TCI state for at least one Control Resource Set (CORESET) using a control message comprising seven or more bits of TCI State ID field. In this way, the control message can be used to receive additional TCI states. In some embodiments, this allows the physical cell ID to be added to the TCI state.

15 Claims, 18 Drawing Sheets

SERVING CELL ID (8 BITS)

CORESET ID (8 BITS)

TCI STATE (8 BITS)

(56)  References Cited

U.S. PATENT DOCUMENTS

| 2019/0297547 A1* | 9/2019 | Tsai | H04W 36/00725 |
|---|---|---|---|
| 2020/0045709 A1* | 2/2020 | Seo | H04W 72/53 |
| 2020/0145062 A1* | 5/2020 | Jung | H04W 72/23 |
| 2020/0351069 A1* | 11/2020 | Grant | H04L 5/0098 |
| 2020/0359407 A1 | 11/2020 | Takeda et al. | |
| 2021/0184733 A1* | 6/2021 | Cao | H04W 72/53 |
| 2022/0174686 A1* | 6/2022 | Xiao | H04L 5/001 |
| 2022/0231810 A1* | 7/2022 | Matsumura | H04L 5/0091 |
| 2022/0256573 A1* | 8/2022 | Frenne | H04L 5/0053 |
| 2022/0278787 A1* | 9/2022 | Liu | H04W 72/51 |
| 2022/0295516 A1* | 9/2022 | Matsumura | H04L 5/0053 |
| 2023/0076897 A1* | 3/2023 | Svedman | H04W 72/23 |

OTHER PUBLICATIONS

Author Unknown, "Technical Specification Group Radio Access Network; NR; Medium Access Control (MAC) protocol specification (Release 15)," Technical Specification 38.321, Version 15.7.0, Sep. 2019, 3GPP Organizational Partners, 78 pages.
Author Unknown, "Technical Specification Group Radio Access Network; NR; Radio Resource Control (RRC) protocol specification (Release 15)," Technical Specification 38.331, Version 15.7.0, 3GPP Organizational Partners, Sep. 2019, 526 pages.
Nokia, et al., "R1-1811026: On selected NR Rel-15 non-MIMO UE features," 3GPP TSG RAN WG1 Meeting #94-bis, Oct. 8-12, 2018, Chengdu, China, 4 pages.
International Search Report and Written Opinion for International Patent Application No. PCT/IB2020/059573, mailed Jan. 13, 2021, 15 pages.

* cited by examiner

| NUMEROLOGY | SLOT LENGTH | RB BW |
|---|---|---|
| 15 kHz | 1 ms | 180 kHz |
| 30 kHz | 0.5 ms | 360 kHz |
| 60 kHz | 0.25 ms | 720 kHz |
| 120 kHz | 125 μs | 1.44 MHz |
| 240 kHz | 62.5 μs | 2.88 MHz |

*FIG. 2*

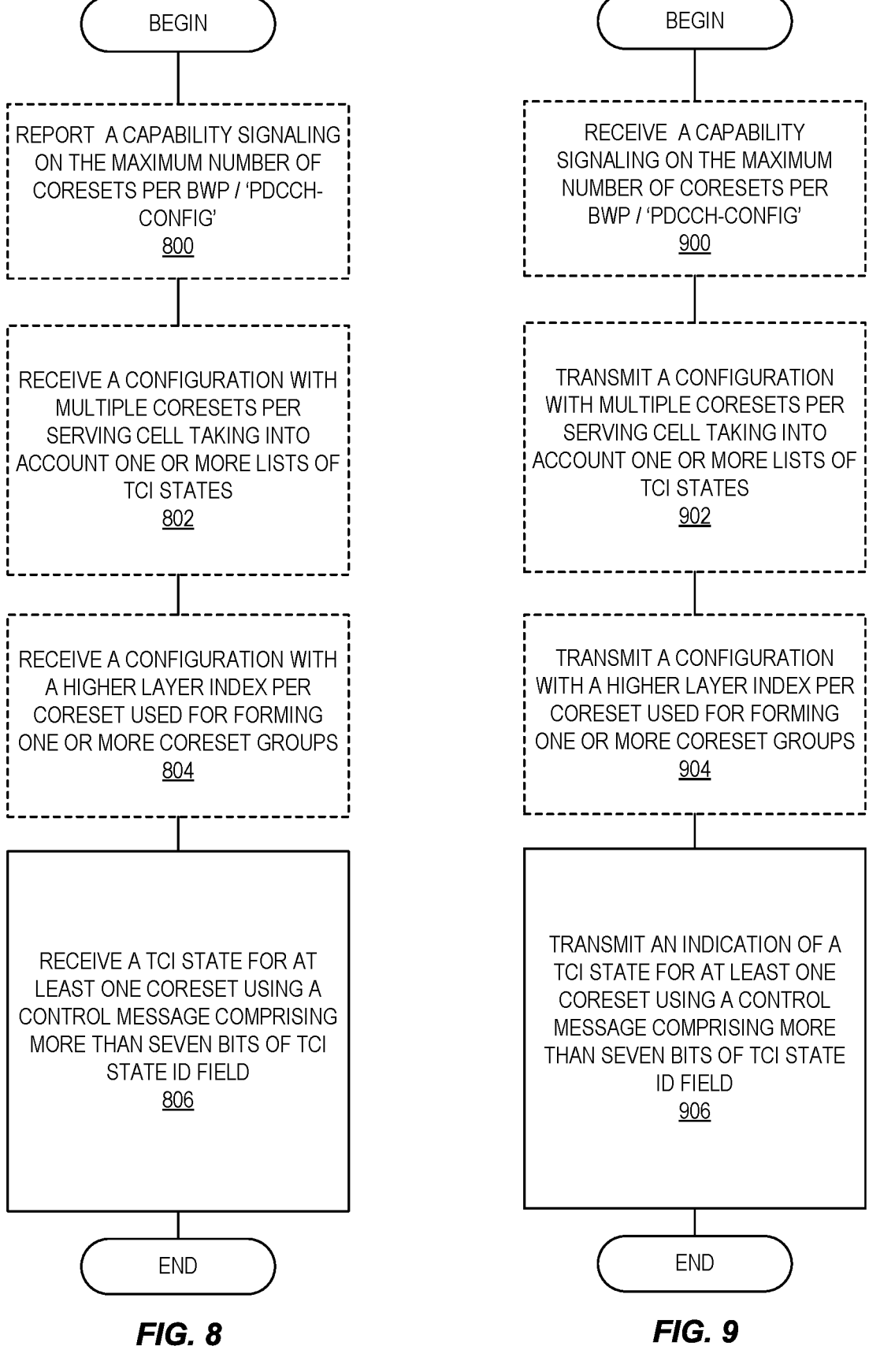
FIG. 8                                    FIG. 9

| SERVING CELL ID (5 BITS) | | R | R | R |
|---|---|---|---|---|
| CORESET ID (5 BITS) | | R | R | R |
| TCI STATE (7 BITS) | | | | R |

FIG. 11

SERVING CELL ID (8 BITS)

CORESET ID (8 BITS)

TCI STATE (8 BITS)

TRANSCEIVER(S)
1606

TX(S) 1608

RX(S) 1610

MEMORY
1604

PROCESSOR(S)
1602

UE
1600

MODULE(S)
1700

SYSTEMS AND METHODS FOR UPDATING ACTIVE TCI STATE FOR MULTI-PDCCH BASED MULTI-TRP

RELATED APPLICATIONS

This application is a 35 U.S.C. § 371 national phase filing of International Application No. PCT/IB2020/059573, filed Oct. 12, 2020, which claims the benefit of provisional patent application Ser. No. 62/914,133, filed Oct. 11, 2019, the disclosures of which are hereby incorporated herein by reference in their entireties.

TECHNICAL FIELD

The present disclosure relates to updating an active Transmission Configuration Indicator (TCI) state.

BACKGROUND

The new generation mobile wireless communication system (5G) or new radio (NR) supports a diverse set of use cases and a diverse set of deployment scenarios.

NR uses Cyclic Prefix Orthogonal Frequency Division Multiplexing (CP-OFDM) in the downlink (i.e., from a network node, New Radio Base Station (gNB), evolved or enhanced NodeB (eNB), or base station, to a User Equipment (UE)) and both CP-OFDM and Discrete Fourier Transform (DFT)-spread OFDM (DFT-S-OFDM) in the uplink (i.e., from UE to gNB). In the time domain, NR downlink and uplink physical resources are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe, and each slot always consists of 14 OFDM symbols, irrespectively of the subcarrier spacing.

Typical data scheduling in NR are per slot basis, an example is shown in FIG. 1 where the first two symbols contain Physical Downlink Control Channel (PDCCH) and the remaining 12 symbols contains Physical Data Channel (PDCH), either a Physical Downlink Data Channel (PDSCH) or Physical Uplink Data Channel (PUSCH).

Different subcarrier spacing values are supported in NR. The supported subcarrier spacing values (also referred to as different numerologies) are given by $\Delta f=(15\times2^{\alpha})$ kHz where $\alpha$ is a non-negative integer. $\Delta f=15$ kHz is the basic subcarrier spacing that is also used in LTE. The slot durations at different subcarrier spacings are shown in FIG. 2.

In the frequency domain physical resource definition, a system bandwidth is divided into Resource Blocks (RBs); each corresponds to 12 contiguous subcarriers. The Common RBs (CRBs) are numbered starting with 0 from one end of the system bandwidth. The UE is configured with one or up to four Bandwidth Part (BWPs) which may be a subset of the RBs supported on a carrier. Hence, a BWP may start at a CRB larger than zero. All configured BWPs have a common reference, the CRB 0. Hence, a UE can be configured a narrow BWP (e.g., 10 MHz) and a wide BWP (e.g., 100 MHz), but only one BWP can be active for the UE at a given point in time. The physical RB (PRB) are numbered from 0 to N-1 within a BWP (but the $0^{th}$ PRB may thus be the $K^{th}$ CRB where K>0).

The basic NR physical time-frequency resource grid is illustrated in FIG. 3, where only one Resource Block (RB)

within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. When a UE first detects and decodes PDCCH and the decoding is successful, it then decodes the corresponding PDSCH based on the decoded control information in the PDCCH.

Uplink data transmission can also be dynamically scheduled using PDCCH. Similar to downlink, a UE first decodes uplink grants in PDCCH and then transmits data over the PUSCH based on the decoded control information in the uplink grant such as modulation order, coding rate, uplink resource allocation, etc.

QCL and TCI states: Several signals can be transmitted from the same base station antenna from different antenna ports. These signals can have the same large-scale properties, for instance, in terms of Doppler shift/spread, average delay spread, or average delay, when measured at the receiver. These antenna ports are then said to be Quasi Co-Located (QCL).

The network can then signal to the UE that two antenna ports are QCL. If the UE knows that two antenna ports are QCL with respect to a certain parameter (e.g., Doppler spread), the UE can estimate that parameter based on a reference signal transmitted one of the antenna ports and use that estimate when receiving another reference signal or physical channel the other antenna port. Typically, the first antenna port is represented by a measurement reference signal such as a Channel State Information Reference Signal (CSI-RS) (known as source RS) and the second antenna port is a demodulation reference signal (DMRS) (known as target RS) for PDSCH or PDCCH reception.

For instance, if antenna ports A and B are QCL with respect to average delay, the UE can estimate the average delay from the signal received from antenna port A (known as the source Reference Signal (RS)) and assume that the signal received from antenna port B (target RS) has the same average delay. This is useful for demodulation since the UE can know the properties of the channel beforehand when trying to measure the channel utilizing the DMRS, which may help the UE in, for instance, selecting an appropriate channel estimation filter.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}

Type B: {Doppler shift, Doppler spread}

Type C: {average delay, Doppler shift}

Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. This is helpful for a UE that uses analog beamforming to receive signals, since the UE needs to adjust its RX beam in some direction prior to receiving a certain signal. If the UE knows that the signal is spatially QCL with some other signal it has received earlier, then it can safely use the same RX beam to receive also this signal. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for Tracking (TRS) for time/frequency offset estimation. To be able to use any QCL reference, the UE would have to receive it with a sufficiently good Signal to Interference Noise Ratio (SINR). In many cases, this means that the TRS has to be transmitted in a suitable beam to a certain UE.

To introduce dynamics in beam and Transmission Reception Point (TRP) selection, the UE can be configured through RRC signaling with M Transmission Configuration Indicator (TCI) states, where M is up to 128 in Frequency Range 2 (FR2) for the purpose of PDSCH reception and up to eight in FR1, depending on UE capability.

Each TCI state contains QCL information, i.e., one or two source Downlink (DL) RSs, each source RS associated with a QCL type. For example, a TCI state contains a pair of reference signals, each associated with a QCL type, e.g., two different CSI-RSs {CSI-RS1, CSI-RS2} are configured in the TCI state as {qcl-Type1,qcl-Type2}={Type A, Type D}. It means the UE can derive Doppler shift, Doppler spread, average delay, delay spread from CSI-RS1 and Spatial Rx parameters (i.e., the RX beam to use) from CSI-RS2.

Each of the M states in the list of TCI states can be interpreted as a list of M possible beams transmitted from the network or a list of M possible TRPs used by the network to communicate with the UE. The M TCI states can also be interpreted as a combination of one or multiple beams transmitted from one or multiple TRPs.

A first list of available TCI states is configured for PDSCH, and a second list of TCI states is configured for PDCCH. Each TCI state contains a pointer, known as TCI State ID, which points to the TCI state. The network then activates via MAC CE one TCI state for PDCCH (i.e., provides a TCI for PDCCH) and up to eight active TCI states for PDSCH. The number of active TCI states the UE support is a UE capability but the maximum is eight.

Each configured TCI state contains parameters for the quasi co-location associations between source reference signals (CSI-RS or SS/PBCH) and target reference signals (e.g., PDSCH/PDCCH DMRS ports). TCI states are also used to convey QCL information for the reception of CSI-RS.

Assume a UE is configured with four active TCI states (from a list of totally 64 configured TCI states). Hence, 60 TCI states are inactive for this particular UE (but some may be active for another UE) and the UE need not be prepared to have large scale parameters estimated for those. But the UE continuously tracks and updates the large scale parameters for the four active TCI states by measurements and analysis of the source RSs indicated by each TCI state. When scheduling a PDSCH to a UE, the DCI contains a pointer to one active TCI. The UE then knows which large scale parameter estimate to use when performing PDSCH DMRS channel estimation and thus PDSCH demodulation.

TCI state Indication for UE-specific PDCCH via MAC CE: Now the details of the MAC CE signaling that is used to indicate TCI state are provided for UE specific PDCCH. The structure of the MAC CE for indicating a TCI state for UE specific PDCCH is given in FIG. 4.

As shown in FIG. 4, the MAC CE contains the following fields:

Serving Cell ID: This field indicates the identity of the Serving Cell for which the MAC CE applies. The length of the field is 5 bits;

CORESET ID: This field indicates a Control Resource Set (CORESET) identified with ControlResourceSetId as specified in 3GPP TS 38.331, for which the TCI State is being indicated. In case the value of the field is 0, the field refers to the Control Resource Set configured by controlResourceSetZero as specified in TS 38.331. The length of the field is 4 bits;

TCI State ID: This field indicates the TCI state identified by TCI-StateId as specified in TS 38.331 applicable to the Control Resource Set identified by CORESET ID field. If the field of CORESET ID is set to 0, this field indicates a TCI-StateId for a TCI state of the first 64 TCI-states configured by TCI-States-ToAddModList and TCI-States-ToReleaseList in the PDSCH-Config in the active BWP. If the field of CORESET ID is set to the other value than 0, this field indicates a TCI-StateId configured by TCI-StatesPDCCH-ToAddList and TCI-StatesPDCCH-ToReleaseList in the controlResource-Set identified by the indicated CORESET ID. The length of the field is seven bits.

The MAC CE for Indication of TCI States for UE-specific PDCCH has a fixed size of 16 bits.

Note that CORESET ID identified with ControlResource-SetId is specified in 3GPP TS38.331 as follows:

The ControlResourceSetId IE concerns a short identity used to identify a control resource set within a serving cell. The ControlResourceSetId=0 identifies the ControlResourceSet #0 configured via PBCH (MIB) and in control-ResourceSetZero (ServingCellConfigCommon). The ID space is used across the BWPs of a Serving Cell. The number of CORESETs per BWP is limited to three (including common and UE-specific CORESETs).

```
-- ASN1START
-- TAG-CONTROLRESOURCESETID-START
...
ControlResourceSetId ::=                INTEGER
(0..maxNrofControlResourceSets-1)
-- TAG-CONTROLRESOURCESETID-STOP
-- ASN1STOP
```

In NR Rel-15, maxNrofControlResourceSets representing the maximum number of CORESETs per serving cell is 12. The maximum number of Bandwidth parts (BWPs) per serving cell is four in NR Rel-15. These maximum values are defined in TS 38.331 Section 6.4 as follows:

RRC Multiplicity and Type Constraint Values
Multiplicity and Type Constraint Definitions

```
-- ASN1START
-- TAG-MULTIPLICITY-AND-TYPE-CONSTRAINT-DEFINITIONS-START
...
maxNrofBWPs                             INTEGER ::= 4          --
Maximum number of BWPs per serving cell
...
```

-continued

| maxNrofControlResourceSets-1 | INTEGER ::= 11 | -- |
| --- | --- | --- |
| Max number of CoReSets configurable on a serving cell minus 1 | | |

Non-Coherent Joint Transmission (NC-JT) refers to Multiple Input Multiple Output (MIMO) data transmission over multiple TRPs in which different MIMO layers are transmitted over different TRPs. An example is shown in FIG. 5, where data are sent to a UE over two TRPs, each TRP carrying one TB mapped to one code word. When the UE has four receive antennas while each of the TRPs has only two transmit antennas, the UE can support up to four MIMO layers, but each TRP can maximally transmit two MIMO layers. In this case, by transmitting data over two TRPs to the UE, the peak data rate to the UE can be increased, as up to four aggregated layers from the two TRPs can be used. This is beneficial when the traffic load and thus the resource utilization is low in each TRP. In this example, a single scheduler is used to schedule data over the two TRPs. One PDCCH is transmitted from each of the two TRPs in a slot, each schedule one PDSCH. This is referred to as a multi-PDCCH or multi-DCI scheme in which a UE receives two PDCCHs and the associated two PDSCHs in a slot from two TRPs.

In another scenario shown in FIG. 6, independent schedulers are used in each TRP. In this case, only semi-static to semi-dynamic coordination between the two schedulers can be done due the non-ideal backhaul, i.e., backhaul with large delay and/or delay variations which are comparable to the cyclic prefix length or in some cases even longer, up to several milliseconds.

In RAN1 #96, the following agreement was made:

Agreement: To support multiple-PDCCH based multi-TRP/panel transmission with intra-cell (same cell ID) and inter-cell (different Cell IDs), the following RRC configuration can be used to link multiple PDCCH/PDSCH pairs with multiple TRPs one CORESET in a "PDCCH-config" corresponds to one TRP For Further Study (FFS) whether to increase the number of CORESETs per "PDCCH-config" more than 3

FFS: UE monitoring/decoding behavior for multiple PDCCHs.

According to the above highlighted part in the agreement, a CORESET is used to differentiate between TRPs. That is, one CORESET corresponds to one of the TRPs and another CORESET corresponds to the second TRP. Note that there is one 'PDCCH-config' per dedicated downlink BWP. In RAN1 #97, the following was further agreed:

Agreement: For a multi-PDCCH based multi-TRP operation, increase the maximum number of CORESETs per "PDCCH-config" to 5, according to UE capability FFS: How to define capability per TRP Study whether enhancement of reducing PDCCH blocking rate, e.g., Hash function enhancement, and UE complexity is needed, e.g., taking into account overbooking PDCCH candidates and blind detection reduction per TRP/CORESET group.

According to the above highlighted part in the agreement, the number of CORESETs per 'PDCCH-config' was increased to five from three (note that three is the limit for NR Rel-15) in order to flexibly assign 2-3 CORESETs per TRP. Furthermore, in RAN1 #97, it was agreed to introduce a higher layer index per CORESET in order to group the CORESETs. The CORESETs with the same higher layer index value belong to the same CORESET group and corresponds to one TRP.

Hence, in NR Rel-16, for multi-TRP PDSCH transmission with multiple PDCCHs, one or multiple CORESET groups (configured via a higher layer index per CORESET) may be configured for a UE. A CORESET group consists of one or more CORESETs.

SUMMARY

Systems and methods for updating active Transmission Configuration Indicator (TCI) state for multi-Physical Downlink Control Channel (PDCCH) based Multi-Transmission Reception Point (TRP) are provided. In some embodiments, a method performed by a wireless device for receiving one or more, TCI states includes: receiving a TCI state for at least one Control Resource Set (CORESET) using a control message comprising seven or more bits of TCI State ID field. In this way, the control message can be used to receive additional TCI states. In some embodiments, this allows the physical cell ID to be added to the TCI state.

Different solutions are proposed for the problem of receiving TCI state to a CORESET when the number of CORESETs per serving cell exceeds 16 or when the number of CORESETs per serving cell does not exceed 16. Some solutions proposed in the current disclosure are summarized below: In some embodiments, a new MAC CE with CORE-SET field size of at least five bits is proposed. In some embodiments, the Rel-15 MAC CE is reused while the CORESET ID field is reinterpreted when one or multiple CORESET groups are configured. In some embodiments, the Rel-15 MAC CE is reused while the maximum number of CORESETs per serving cell is limited to 16 via UE capability signaling.

There are, proposed herein, various embodiments which address one or more of the issues disclosed herein. Systems and methods for receiving one or more TCI states are provided. In some embodiments, a method performed by a wireless device for receiving one or more TCI states includes optionally reporting, to a network node, a capability signaling on the maximum number of CORESETs per 'PDCCH-config'. The method also optionally includes receiving a configuration with multiple CORESETs per serving cell taking into account one or more lists of TCI states. The method also optionally includes receiving a configuration with a higher layer index per CORESET used for forming one or more CORESET groups. The method also includes the wireless device receiving a TCI state for at least one CORESET using a control message comprising one of: four bits of CORESET ID field; and five or more bits of CORESET ID field. In this way, according to some embodiments, TCI state via MAC CE can be received for UE-specific PDCCH when the maximum number of CORE-SETs per "PDCCH-config" is increased to five. In some flavors of the solution, a new MAC CE does not need to be defined. MAC CEs are identified by Logical Channel ID (LCID) field which has limited length. In NR, the MAC CEs are used in addition to DCI for setting physical layer parameters faster that what RRC reconfiguration is able to do. The number of MAC CEs in NR Rel-15 is already large and 3GPP sees continuous need for new ones. As the LCID space is limited, there is a need to start reusing old MAC CEs where possible by allowing new interpretation while still keeping legacy interpretation working for UEs working on legacy mode. This is an added benefit of some solutions proposed herein which avoids the need for a new MAC CE.

In some embodiments, a method performed by a base station for transmitting one or more TCI states includes optionally receiving a capability signaling on the maximum number of CORESETs per 'PDCCH-config'. The method also optionally includes transmitting a configuration with multiple CORESETs per serving cell taking into account one or more lists of TCI states. The method also optionally includes transmitting a configuration with a higher layer index per CORESET used for forming one or more CORE-SET groups. The method also includes the network node receiving an indication a TCI state for at least one CORE-SET using a control message comprising one of: four bits of CORESET ID field; and five or more bits of CORESET ID field.

In some embodiments, the control message is a MAC CE.

In some embodiments, when the control message comprises four bits of CORESET ID field, the CORESET ID field is reinterpreted when one or multiple CORESET groups are configured.

In some embodiments, the CORESET ID indicated in the control message with value m is reinterpreted as the $m^{th}$ CORESET within the CORESET group as configured in RRC.

In some embodiments, the CORESET group is known to the wireless device as the group of the CORESET that carries the PDCCH which is used to schedule the PDSCH carrying the TCI state indication control message.

In some embodiments, when the control message comprises four bits of CORESET ID field, the maximum number of CORESETs per serving cell is limited to 16. In some embodiments, the maximum number of CORESETs per serving cell is limited via wireless device capability signaling.

In some embodiments, reporting the capability signaling further comprises indicating a maximum number of CORE-SETs per 'PDCCH-config' as well as the corresponding number of BWPs.

In some embodiments, receiving the configuration further comprises receiving the configuration with multiple CORE-SETs per serving cell taking into account the reported capability signaling and the one or more lists of TCI states.

In some embodiments, the wireless device is configured to receive multiple PDCCH in a given slot. In some embodiments, the maximum number of CORESETs per "PDCCH-config" is five or more. In some embodiments, the maximum number of BWPs per serving cell is four or more.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2 illustrates slot durations at different subcarrier spacings;

8

Figure 5:
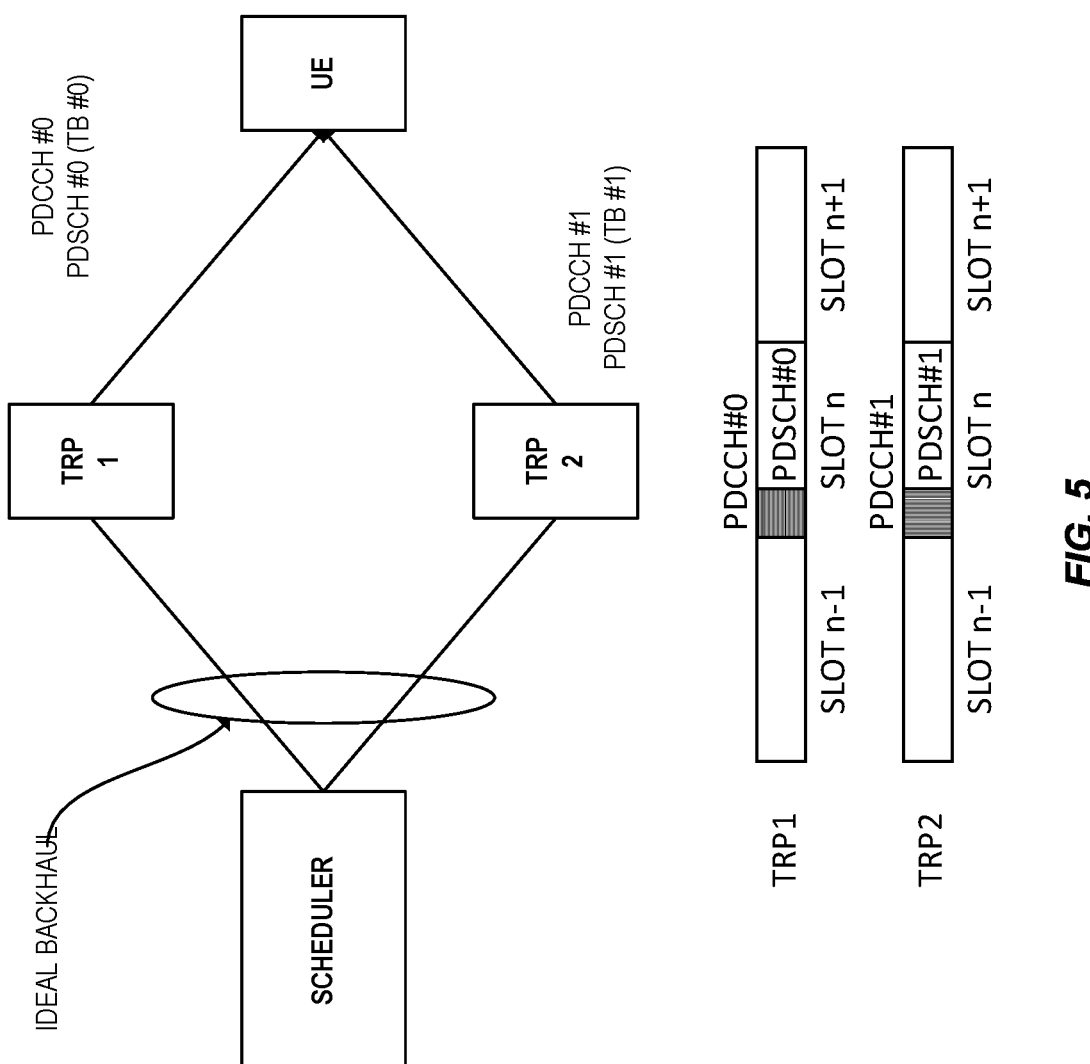
Figure 6:
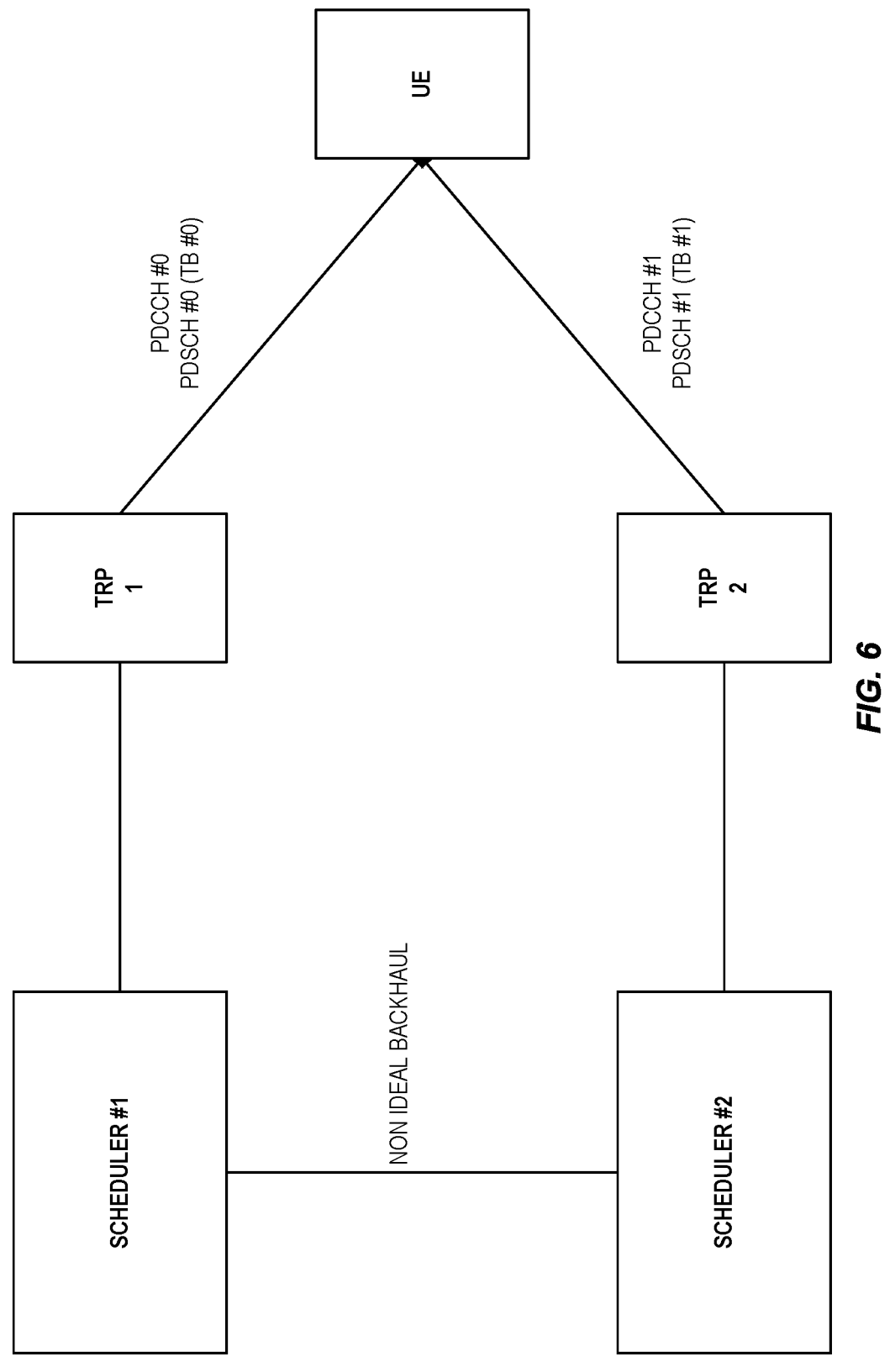
Figure 7:
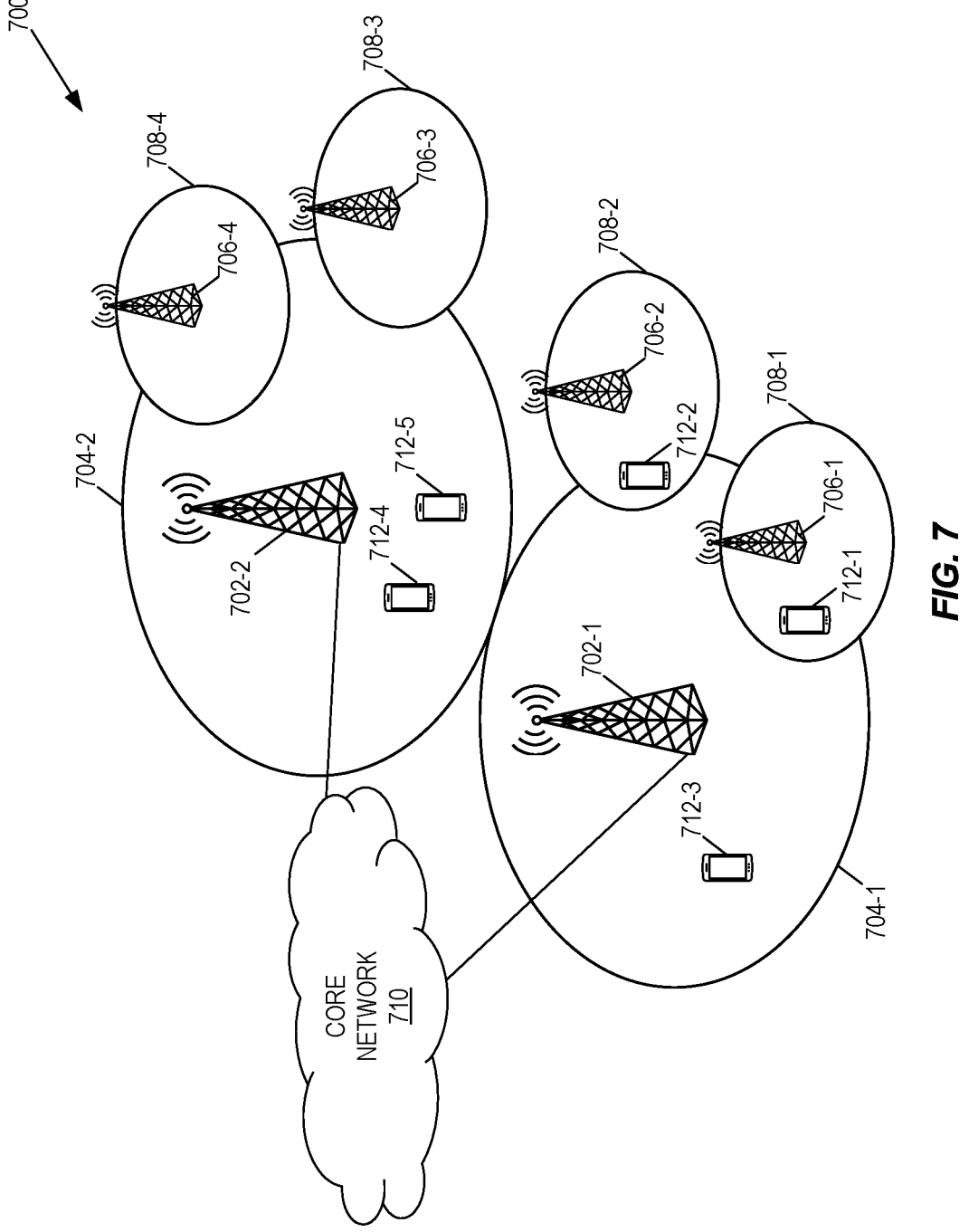
Figure 10:
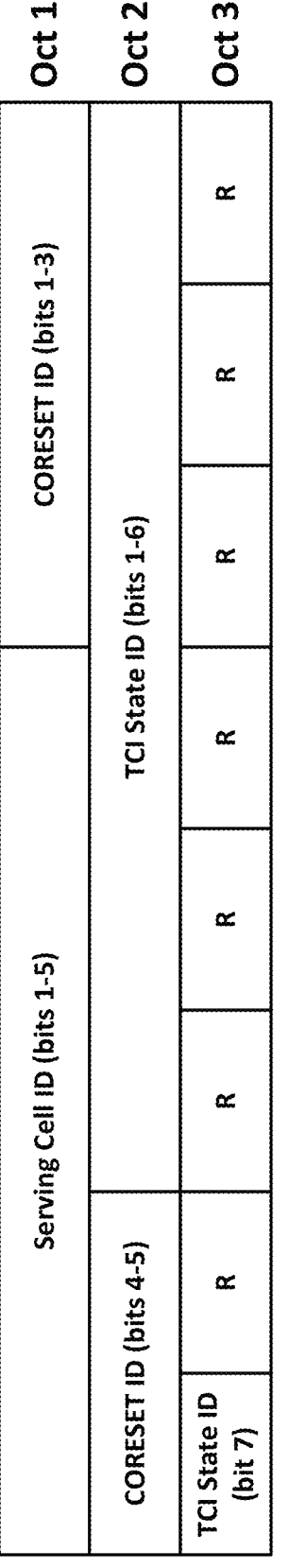
Figure 13:
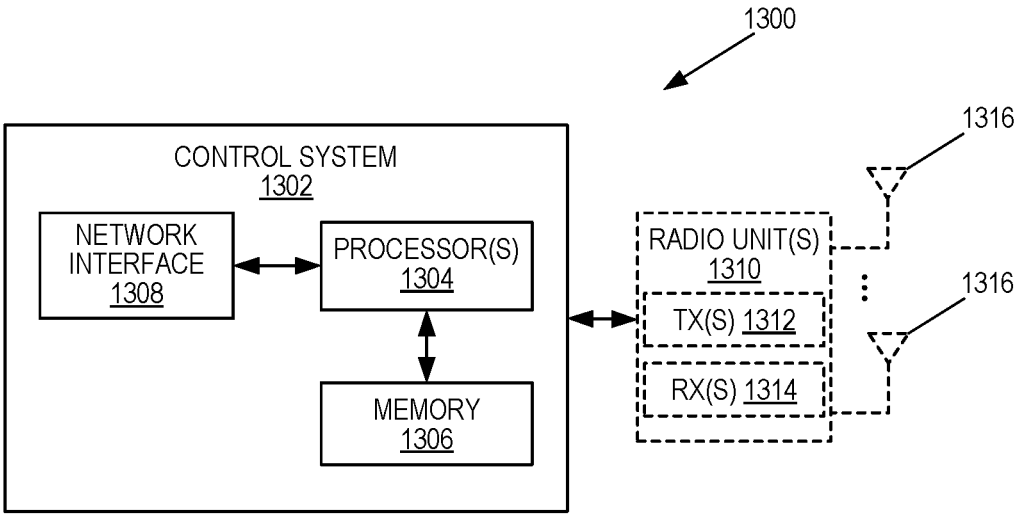
Figure 15:
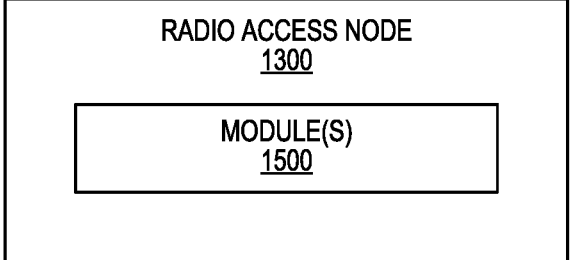
Figure 14:
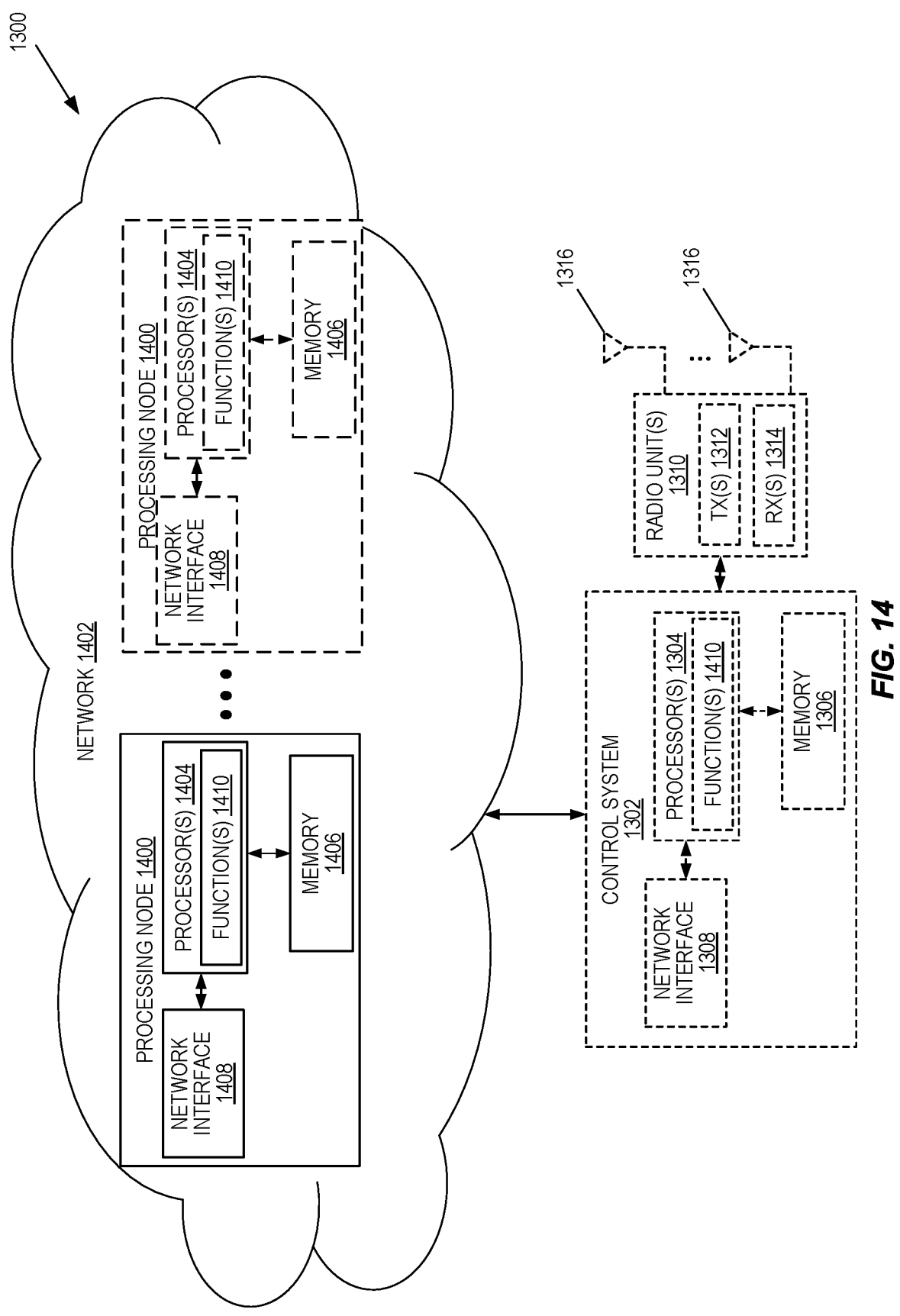
Figure 16:
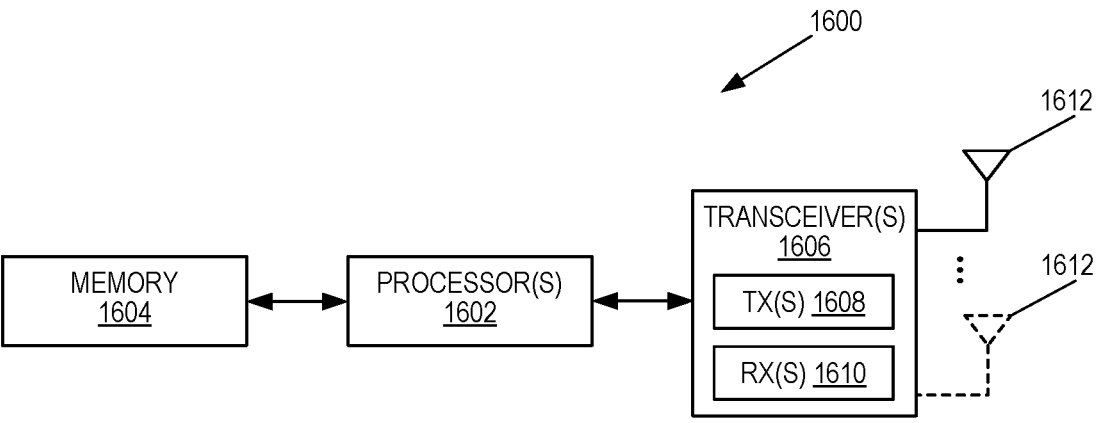
Figure 17:
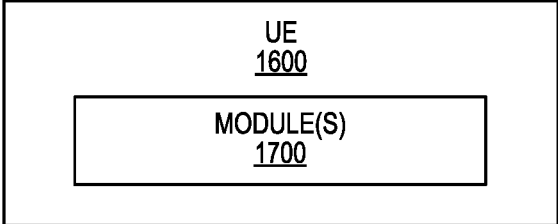
Figure 18:
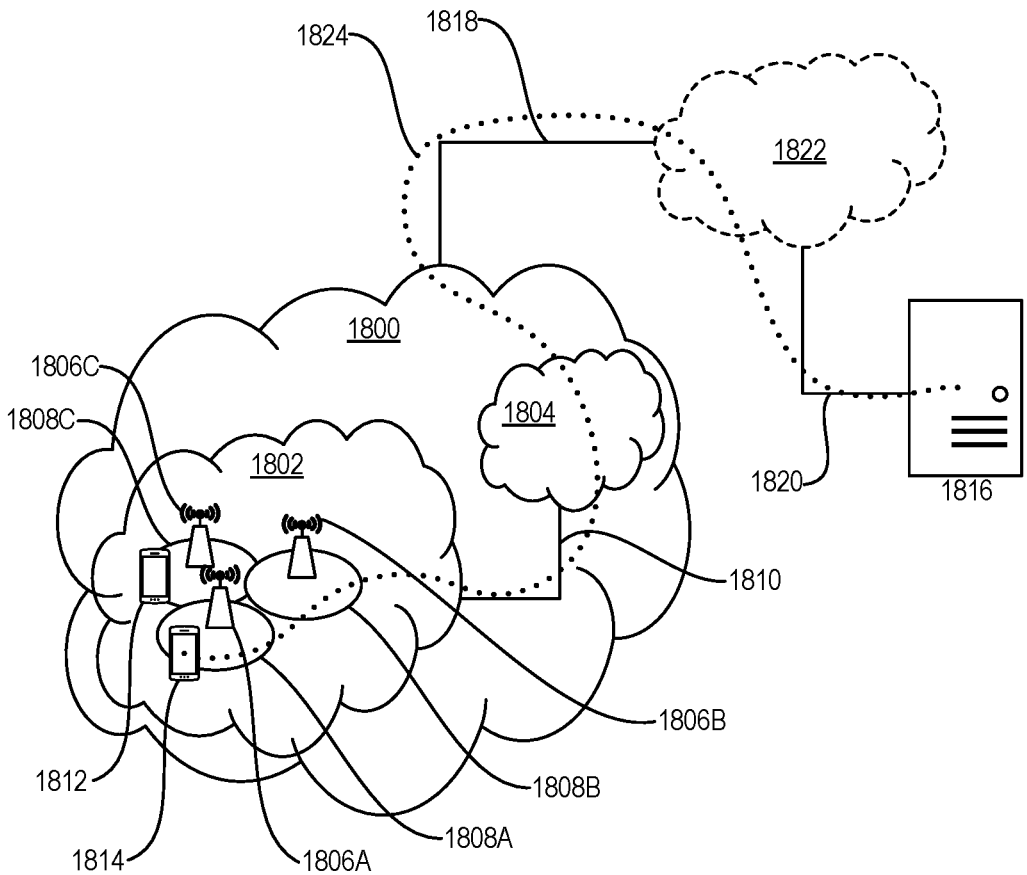
Figure 19:
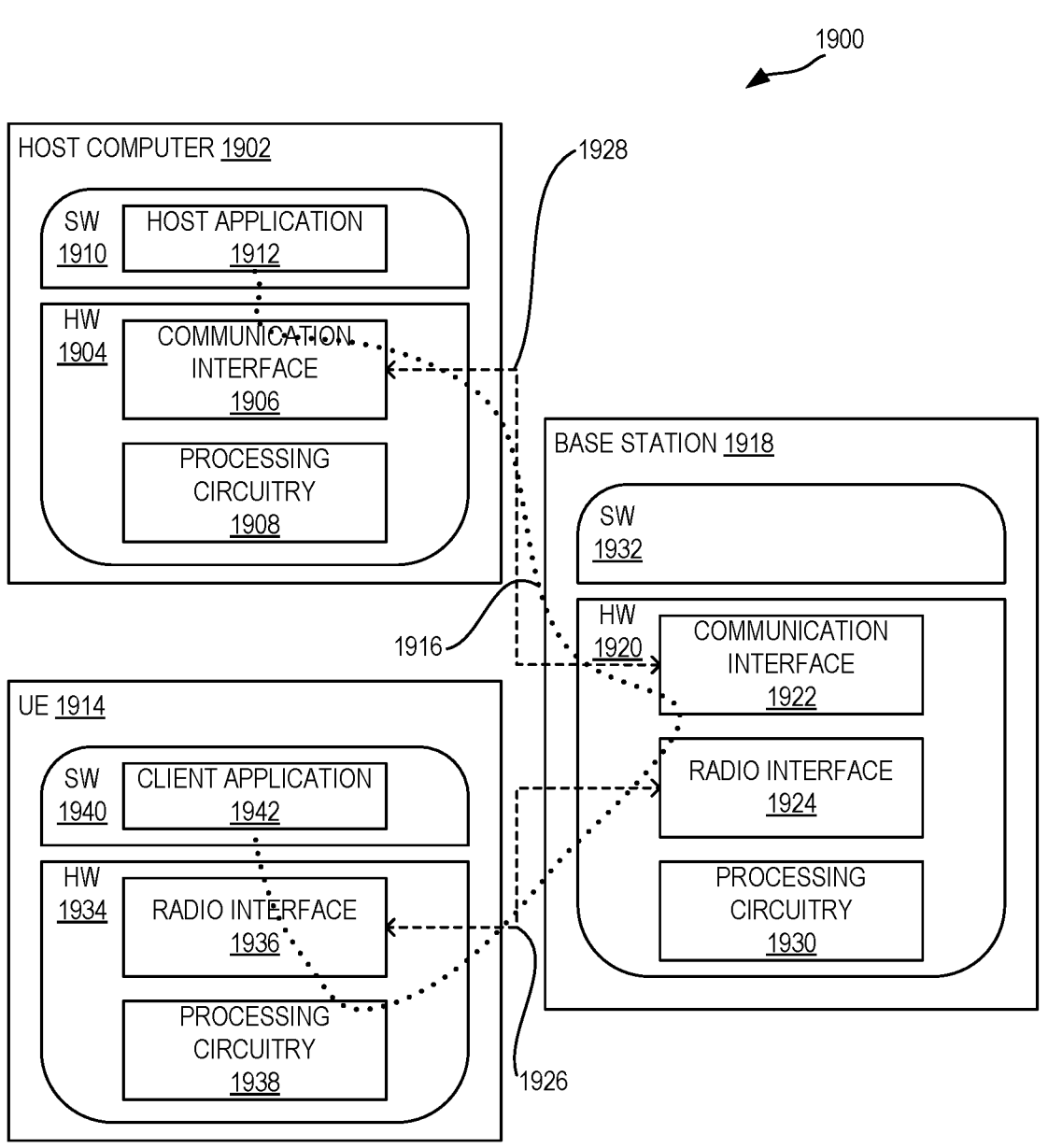
Figures 20, 21:
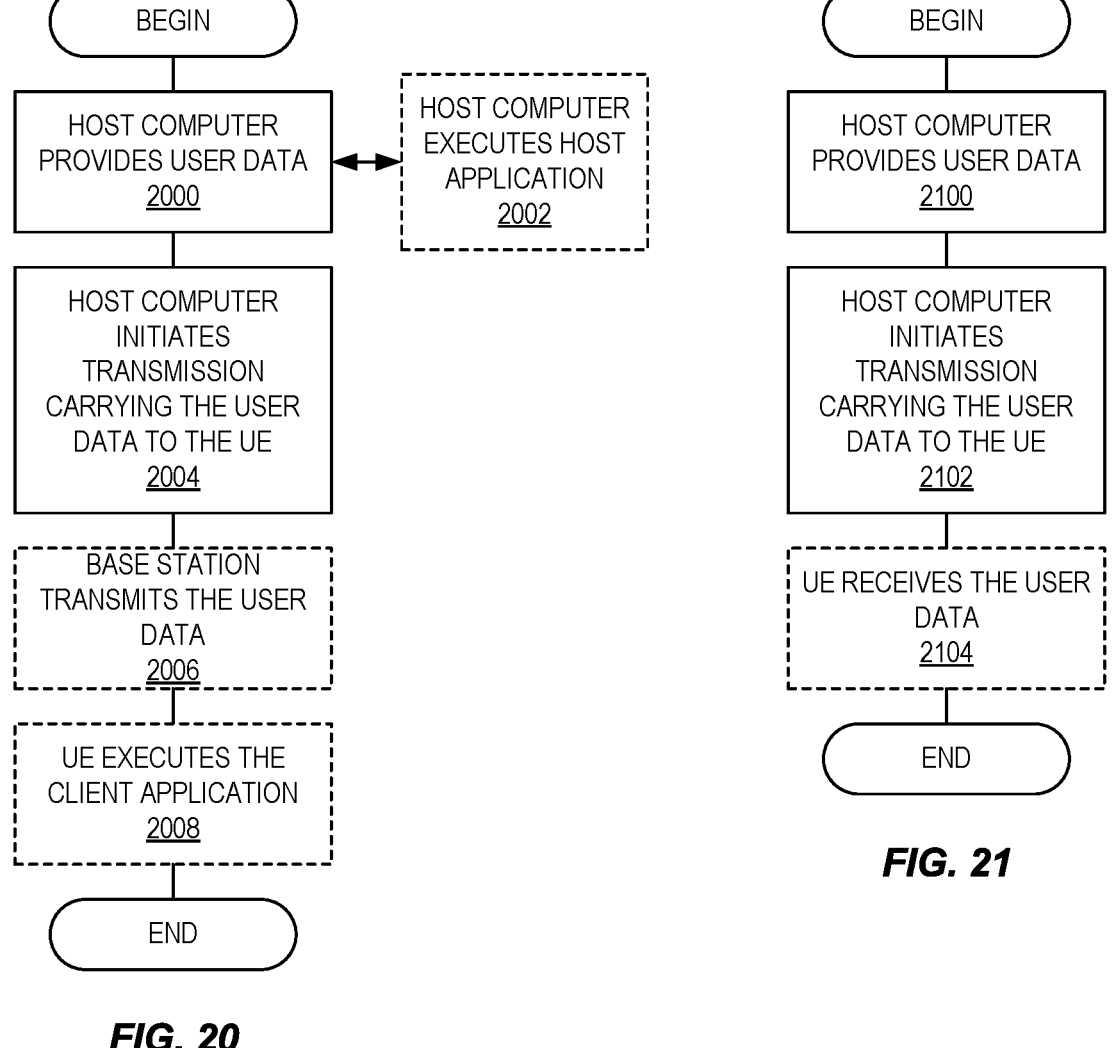
Figures 22, 23:
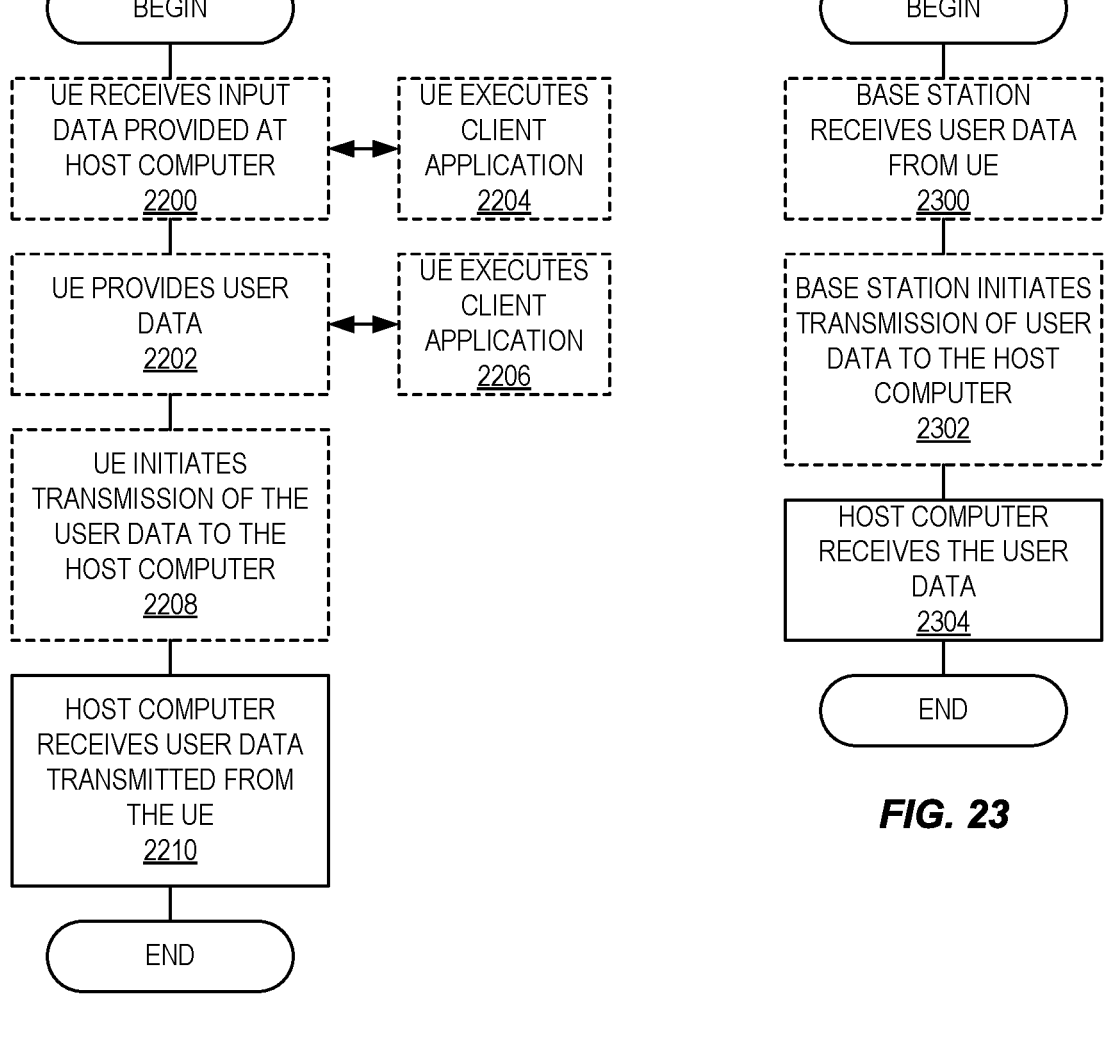

FIG. 5 illustrates Non-Coherent Joint Transmission (NC-JT) referring to Multiple Input Multiple Output (MIMO) data transmission over multiple TRPs in which different MIMO layers are transmitted over different TRPs;

FIG. 6 illustrates independent schedulers used in each TRP;

FIG. 7 illustrates one example of a cellular communications system in which embodiments of the present disclosure may be implemented;

FIG. 8 illustrates the operation of a wireless device according to some embodiments of the current disclosure;

FIG. 9 illustrates the operation of a network node according to some embodiments of the current disclosure;

FIG. 10 illustrates a new MAC CE defined in NR Rel-16 consisting of a 5-bit CORESET ID field according to some embodiments of the current disclosure;

FIG. 11 illustrates an alternative new MAC CE for TCI State Indication for the UE-specific PDCCH containing a five bit CORESET ID field, according to some embodiments of the current disclosure;

Figure 12:
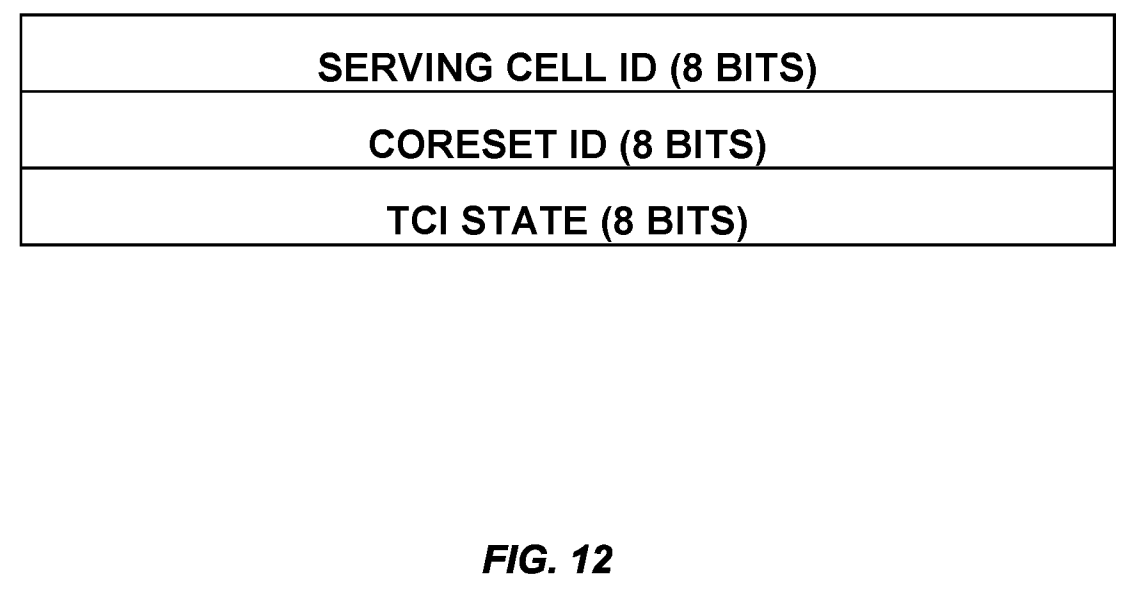

FIG. 12 illustrates an alternative new MAC CE for TCI State Indication for the UE-specific PDCCH containing a five bit CORESET ID field, according to some embodiments of the current disclosure;

FIG. 13 is a schematic block diagram of a radio access node according to some embodiments of the present disclosure;

FIG. 14 is a schematic block diagram that illustrates a virtualized embodiment of the radio access node according to some embodiments of the present disclosure;

FIG. 15 is a schematic block diagram of the radio access node according to some other embodiments of the present disclosure;

FIG. 16 is a schematic block diagram of a wireless communication device according to some embodiments of the present disclosure;

FIG. 17 is a schematic block diagram of the wireless communication device according to some other embodiments of the present disclosure;

FIG. 18 illustrates a telecommunication network connected via an intermediate network to a host computer in accordance with some embodiments of the present disclosure;

FIG. 19 is a generalized block diagram of a host computer communicating via a base station with a UE over a partially wireless connection in accordance with some embodiments of the present disclosure;

FIG. 20 is a flowchart illustrating a method implemented in a communication system in accordance with one embodiment of the present disclosure;

FIG. 21 is a flowchart illustrating a method implemented in a communication system in accordance with one embodiment of the present disclosure;

FIG. 22 is a flowchart illustrating a method implemented in a communication system in accordance with one embodiment of the present disclosure; and FIG. 23 is a flowchart illustrating a method implemented in a communication system in accordance with one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 7 illustrates one example of a cellular communications system 700 in which embodiments of the present disclosure may be implemented. In the embodiments described herein, the cellular communications system 700 is a 5G system (5GS) including a NR RAN. In this example, the RAN includes base stations 702-1 and 702-2, which in 5G NR are referred to as gNBs (e.g., LTE RAN nodes connected to 5GC, which are referred to as gn-eNBs), controlling corresponding (macro) cells 704-1 and 704-2. The base stations 702-1 and 702-2 are generally referred to herein collectively as base stations 702 and individually as base station 702. Likewise, the (macro) cells 704-1 and 704-2 are generally referred to herein collectively as (macro) cells 704 and individually as (macro) cell 704. The RAN may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710, which in the 5GS is referred to as the 5G core (5GC). The base stations 702 (and optionally the low power nodes 706) are connected to the core network 710.

The base stations 702 and the low power nodes 706 provide service to wireless communication devices 712-1 through 712-5 in the corresponding cells 704 and 708. The wireless communication devices 712-1 through 712-5 are generally referred to herein collectively as wireless communication devices 712 and individually as wireless communication device 712. In the following description, the wireless communication devices 712 are oftentimes UEs, but the present disclosure is not limited thereto.

With the recent agreement to increase the maximum number of CORESETs per "PDCCH-config" to five, the maximum number of CORESETs per serving cell will increase to 20 (recall that the maximum number of BWPs per serving cell is four, hence the maximum number of CORESETs per serving cell is 4*5). One issue is that the TCI state indication MAC CE for UE-specific PDCCH given in FIG. 4 cannot be directly used for the multi-PDCCH multi-TRP as the 'CORESET ID' field in this MAC CE only has 4 bits which can handle up to 16 CORESETs per serving cell. Hence, it is an open problem on how to indicate TCI state for UE-specific PDCCH when the maximum number of CORESETs per "PDCCH-config" is increased to five.

Systems and methods for updating active Transmission Configuration Indicator (TCI) state for multi-Physical Downlink Control Channel (PDCCH) based Multi-Transmission Reception Point (TRP) are provided. In some embodiments, a method performed by a wireless device for receiving one or more, TCI states includes: receiving a TCI state for at least one Control Resource Set (CORESET) using a control message comprising seven or more bits of TCI State ID field. In this way, the control message can be used to indicate additional TCI states. In some embodiments, this allows the physical cell ID to be added to the TCI state.

Systems and methods for receiving one or more TCI states are provided. FIG. 8 illustrates the operation of a wireless device according to some embodiments of the current disclosure. In some embodiments, a method performed by a wireless device for receiving one or more TCI states includes optionally reporting, to a network node, a capability signaling on the maximum number of CORESETs per 'PDCCH-config' (step 800). The method also optionally includes receiving a configuration with multiple CORESETs per serving cell taking into account one or more lists of TCI states (step 802). The method also optionally includes receiving a configuration with a higher layer index per CORESET used for forming one or more CORESET groups (step 804). The method also includes the wireless device receiving a TCI state for at least one CORESET using a control message comprising seven or more bits of TCI State ID field (step 806). The method optionally includes the wireless device receiving a TCI state for at least one CORESET using a control message comprising one of: four bits of CORESET ID field; and five or more bits of CORESET ID field. In this way, according to some embodiments, TCI state via MAC CE can be received for UE-specific PDCCH when the maximum number of CORESETs per "PDCCH-config" is increased to 5. In some flavors of the solution, a new MAC CE does not need to be defined. MAC CEs are identified by LCID field which has limited length. In NR, the MAC CEs are used in addition to DCI for setting physical layer parameters faster that what RRC reconfiguration is able to do. The number of MAC CEs in NR Rel-15 is already large and 3GPP sees continuous need for new ones. As the LCID space is limited, there is a need to start reusing old MAC CEs where possible by allowing new interpretation while still keeping legacy interpretation working for UEs working on legacy mode. This is an added benefit of some solutions proposed herein which avoids the need for a new MAC CE.

FIG. 9 illustrates the operation of a network node according to some embodiments of the current disclosure. In some embodiments, a method performed by a base station for transmitting one or more TCI states includes optionally receiving a capability signaling on the maximum number of CORESETs per 'PDCCH-config' (step 900). The method also optionally includes transmitting a configuration with multiple CORESETs per serving cell taking into account one or more lists of TCI states (step 902). The method also optionally includes transmitting a configuration with a higher layer index per CORESET used for forming one or more CORESET groups (step 904). The method also includes the network node transmitting an indication a TCI state for at least one CORESET using a control message comprising seven or more bits of TCI State ID field (step 906). The method also optionally includes the network node transmitting an indication a TCI state for at least one CORESET using a control message comprising one of: four bits of CORESET ID field; and five or more bits of CORESET ID field.

Embodiment 1

In this embodiment, a solution is proposed where a new MAC CE is defined in NR Rel-16 consisting of a 5-bit CORESET ID field as shown in FIG. 10. With this new MAC CE, TCI states for UE-specific PDCCH can be indicated for up to 32 CORESETs per serving cell. Hence, the case with the maximum number of CORESETs per "PDCCH-config" being increased to five can be easily supported. As there is another octet being used in this MAC CE compared to the Rel-15 MAC CE in FIG. 4, there are seven additional bits as shown in FIG. 10. There are different possibilities on how to use these seven bits. Some example embodiments are given below. FIG. 10 illustrates a new MAC CE for TCI State Indication for UE-specific PDCCH containing a five bit CORESET ID field.

In some embodiments, these 7 bits can be designated as reserved bits (denoted by 'R') as shown in FIG. 10.

In some other embodiments, these 7 bits can be used to indicate additional TCI states. For instance, with a 7-bit TCI states ID field, up to 128 TCI states can be indicated. Hence, if the number of TCI states is increased beyond 128, additional bits can be used for TCI State ID field. For example, if the number of TCI states is increased to 256 or more, then the TCI State ID field can be extended to 8 bits or more bits. In some embodiments, this allows the physical cell ID to be added to the TCI state.

FIG. 11 illustrates an alternative new MAC CE for TCI State Indication for UE-specific PDCCH containing a five bit CORESET ID field, according to some embodiments of the current disclosure. In another embodiment, the MAC CE is defined as in FIG. 11 and each octet is dedicated to Serving cell, CORESET, or TCI state, each having up to eight bits to indicate the given value. FIG. 12 illustrates an alternative new MAC CE for TCI State Indication for UE-specific PDCCH containing a five bit CORESET ID field. Based on the RRC configuration, the UE knows how many bits are used in each octet to indicate serving cell, CORESET, TCI state. In general, the octets could be assigned to indicating any value, and it could be RRC configured or stated in TS 38.321 which aspects each octet represents. Also, the length can be given in the RRC configuration. This embodiment represents a general MAC CE design principle where in one option, octets and what they represent is known to the UE by LCID field, and only length is given by RRC. In the other option, both are given in RRC.

In yet another embodiment, a new MAC CE is defined in FIG. 12, comprising three octets, where each octet corresponds to an 8-bit Serving Cell ID field, 8-bit CORESET ID field and 8-bit TCI state field respectively. FIG. 12 illustrates a second alternative for a new MAC CE for TCI State Indication for UE-specific PDCCH containing a five bit CORESET ID field. That is, the field sizes are increased to 8-bits, and no reserved bits are defined. The benefit with this embodiment is that it is future proof. While the Rel-16 value range for serving cell ID, CORESET ID and TCI state may only require 5, 5, and 7 bits respectively, the required value range may be increased in future releases. With this solution, no new MAC CE design would be needed in that case.

Embodiment 2

Figure 1:
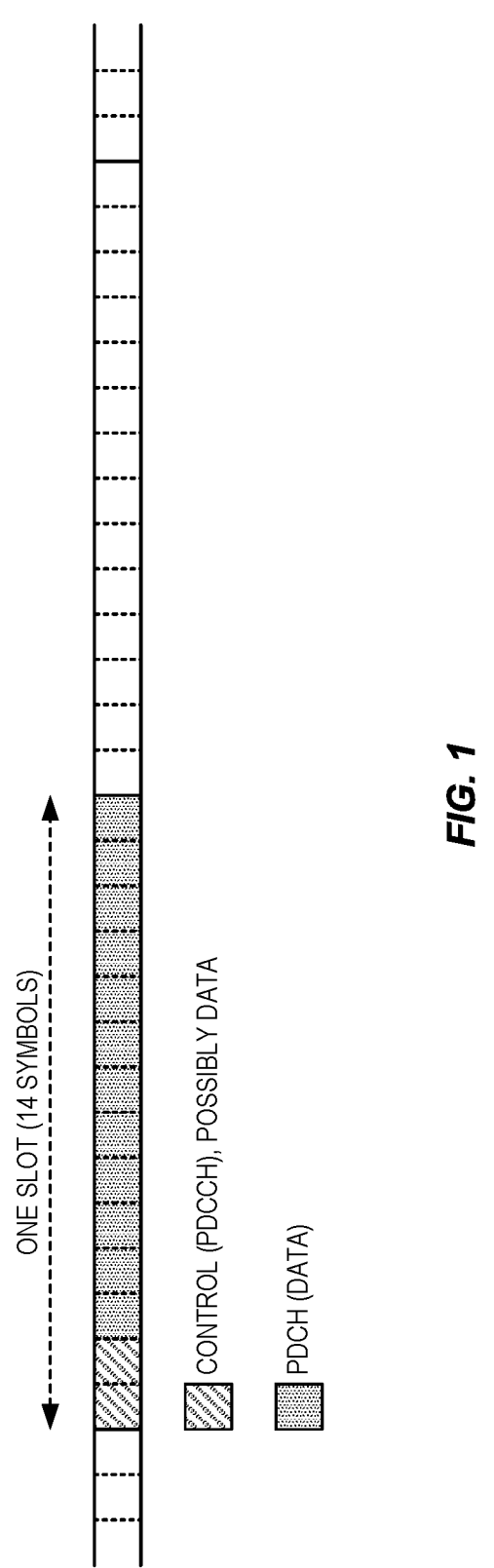
FIG. 1 illustrates data scheduling in NR are per slot basis.
Figure 3:
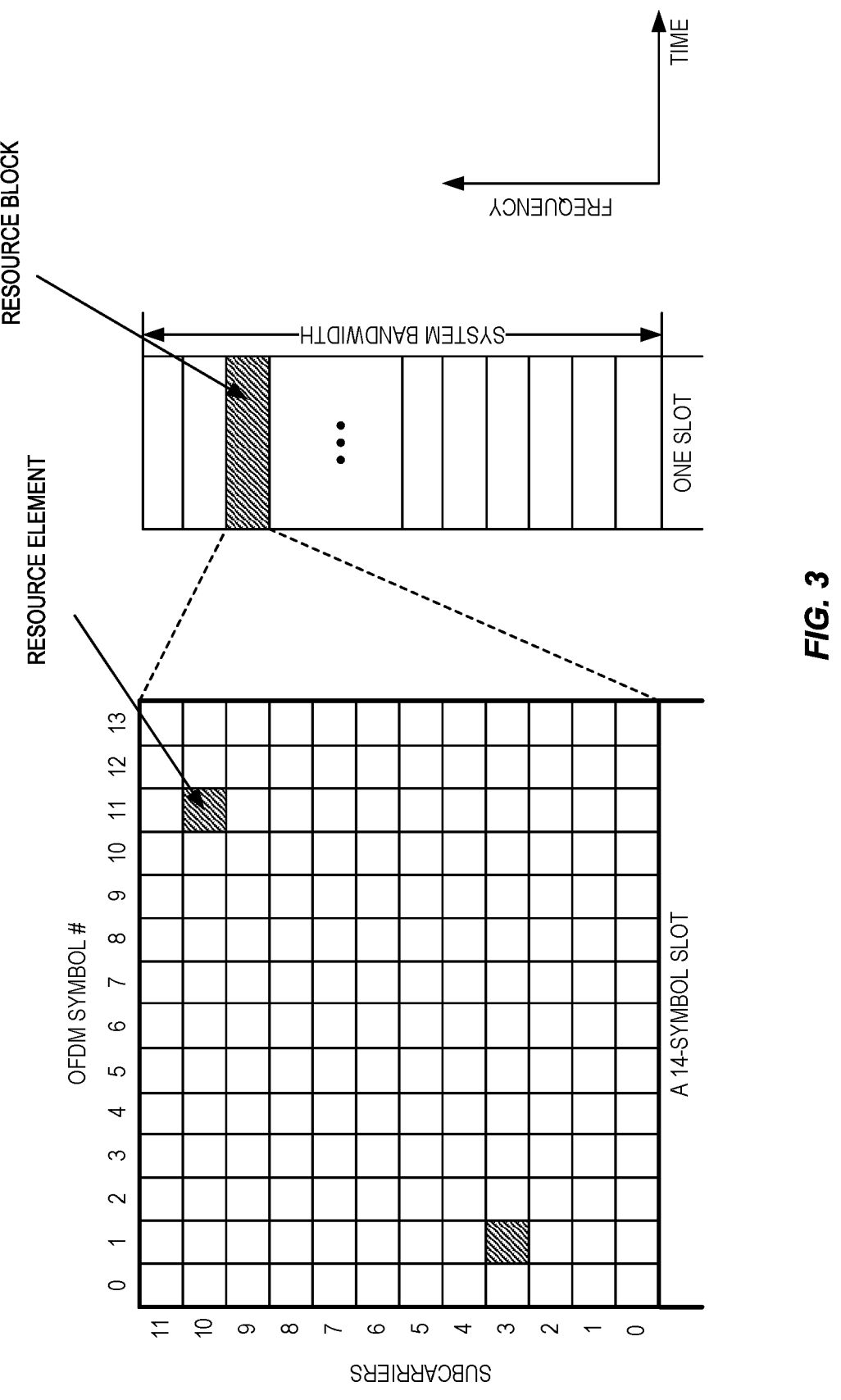
FIG. 3 illustrates a basic NR physical time-frequency resource grid where only one Resource Block (RB) within a 14-symbol slot is shown.
Figure 4:
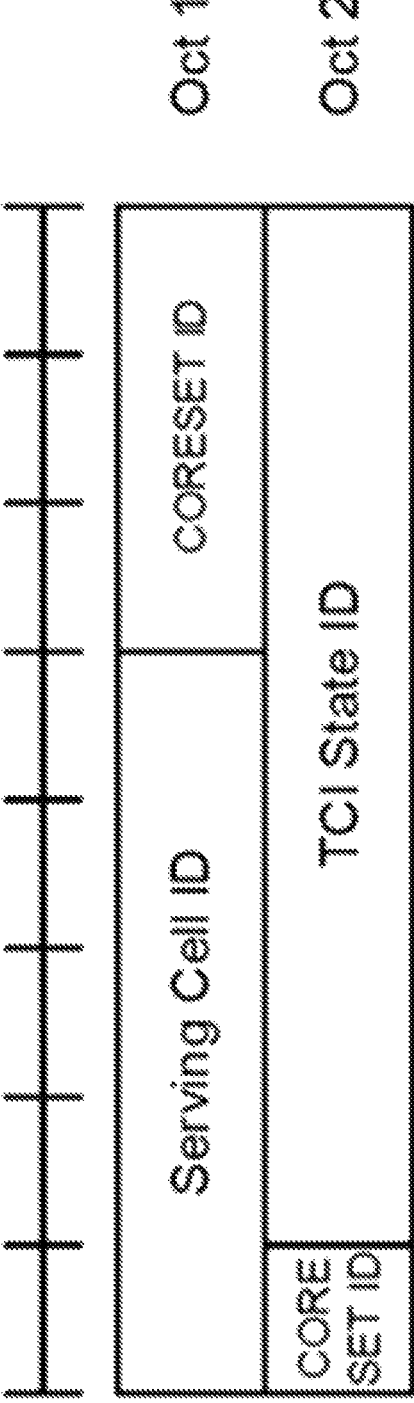
FIG. 4 illustrates a structure of the MAC CE for indicating a TCI state for a UE specific PDCCH.

In this embodiment, a solution is proposed where the NR Rel-15 MAC CE in FIG. 4 is reused but the CORESET ID field in the MAC CE is reinterpreted when one or multiple CORESET groups are configured by RRC to the UE (recall the configuration is done via a higher layer index configured per CORESET). That is, the CORESET ID indicated in the MAC CE with value m is reinterpreted as the $m^{th}$ CORESET within the CORESET group as configured in RRC. The CORESET group is known to the UE as the group of the CORESET that carries the PDCCH which is used to schedule the PDSCH carrying the TCI state indication MAC CE. Consider the simple example given below:

CORESET Group 1 consists of CORESETs with CORESET IDs 1 to 10

CORESET Group 2 consists of CORESTs with CORESET IDs 11 to 20

In this example, a TCI State Indication MAC CE for a UE-specific PDCCH is received via CORESET with CORESET ID 15. The CORESET ID field in the received MAC CE has a value of 3. The following procedures will be followed by the UE:

The UE first determines the CORESET group as 2 since CORESET with CORESET ID 15 belongs to CORESET group 2.

Then, the UE determines the target CORESET whose TCI state is to be updated as the $3^{rd}$ CORESET within CORESET group 2. The $3^{rd}$ CORESET within CORESET group 2 is CORESET with CORESET ID 13. Here, the UE identifies the $3^{rd}$ CORESET assuming the CORESET IDs are ordered in ascending order. However, it is also possible to extend this embodiment to other orderings of CORESET ID as well.

Finally, the UE updates the TCI state (given by the TCI State ID field in the received MAC CE) for target CORESET with CORESET ID 13.

In some embodiments, the above reinterpretation is only applied when the maximum number of CORESETs per serving cell exceeds 16. That is, if a UE indicates a capability of 4 maximum CORESETs per "PDCCH-config", then the maximum number of CORESETs per serving cells is 16, and the CORESET ID field represents the absolute CORESET ID regardless of the CORESET groups (i.e., following the NR rel-15 interpretation). However, if a UE indicates a capability of 5 CORESETs per "PDCCH-config", then the maximum number of CORESETs per serving cells is 20, and the CORESET ID field represents the relative CORESET within the CORESET group.

Embodiment 3

In this embodiment, a solution is proposed where the maximum number of CORESETs per serving cell is limited to 16 via UE capability signaling so that the NR Rel-15 MAC CE in FIG. 4 can be reused. In one variant of this embodiment, when the UE signals its capability, it indicates the maximum number of CORESETs per 'PDCCH-config' as well as the corresponding number of BWPs. Some examples of allowed UE capabilities are as follows:

Maximum four CORESETs per "PDCCH-config" for up to four BWPs->total number of CORESETs per serving cells is 16.

Maximum five CORESETs per "PDCCH-config" for up to three BWPs->total number of CORESETs per serving cells is 15.

Maximum five CORESETs per "PDCCH-config" for up to two BWPs+Maximum three CORESETs per "PDCCH-config" for up to two BWPs->total number of CORESETs per serving cells is 16.

Note that in the last example, there are two different maximum numbers of CORESETs and the corresponding number of BWPs are indicated by the UE.

FIG. 13 is a schematic block diagram of a radio access node 1300 according to some embodiments of the present disclosure. Optional features are represented by dashed boxes. The radio access node 1300 may be, for example, a base station 702 or 706 or a network node that implements all or part of the functionality of the base station 702 or gNB described herein. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 may include one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 may include the control system 1302 and/or the one or more radio units 1310, as described above. The control system 1302 may be connected to the radio unit(s) 1310 via, for example, an optical cable or the like. The radio access node 1300 includes one or more processing nodes 1400 coupled to or included as part of a network(s) 1402. If present, the control system 1302 or the radio unit(s) are connected to the processing node(s) 1400 via the network 1402. Each processing node 1400 includes one or more processors 1404 (e.g., CPUs, ASICs, FPGAs, and/or the like), memory 1406, and a network interface 1408.

In this example, functions 1410 of the radio access node 1300 described herein are implemented at the one or more processing nodes 1400 or distributed across the one or more processing nodes 1400 and the control system 1302 and/or the radio unit(s) 1310 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

FIG. 16 is a schematic block diagram of a wireless communication device 1600 according to some embodiments of the present disclosure. As illustrated, the wireless communication device 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the wireless communication device 1600 described above may be fully or partially implemented in software that is, e.g., stored in the memory 1604 and executed by the processor(s) 1602. Note that the wireless communication device 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the wireless communication device 1600 and/or allowing output of information from the wireless communication device 1600), a power supply (e.g., a battery and associated power circuitry), etc.

In some embodiments, a computer program including instructions which, when executed by at least one processor, causes the at least one processor to carry out the functionality of the wireless communication device 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 17 is a schematic block diagram of the wireless communication device 1600 according to some other embodiments of the present disclosure. The wireless communication device 1600 includes one or more modules 1700, each of which is implemented in software. The module(s) 1700 provide the functionality of the wireless communication device 1600 described herein.

With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as Node Bs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection.

The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides.

It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18.

In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for indicating one or more Transmission Configuration Indicator, TCI, states, the method comprising: indicating (806) a TCI state for at least one Control Resource Set, CORESET, using a control message comprising one of: i. four bits of CORESET ID field; and ii. five or more bits of CORESET ID field.

Embodiment 2: The method of embodiment 1 wherein the control message is a Medium Access Control, MAC, Control Element, CE.

Embodiment 3: The method of any of embodiments 1 to 2 wherein, when the control message comprises four bits of CORESET ID field, the CORESET ID field is reinterpreted when one or multiple CORESET groups are configured.

Embodiment 4: The method of any of embodiments 1 to 3 wherein the CORESET ID indicated in the control message with value m is reinterpreted as the $m^{th}$ CORESET within the CORESET group as configured in Radio Resource Control, RRC.

Embodiment 5: The method of any of embodiments 1 to 4 wherein the CORESET group is known to the wireless device as the group of the CORESET that carries the Physical Downlink Control Channel, PDCCH, which is used to schedule the Physical Downlink Shared Channel, PDSCH, carrying the TCI state indication control message.

Embodiment 6: The method of any of embodiments 1 to 2 wherein when the control message comprises four bits of CORESET ID field, the maximum number of CORESETs per serving cell is limited to Embodiment 16:

Embodiment 7: The method of embodiment 6 wherein the maximum number of CORESETs per serving cell is limited via wireless device capability signaling.

Embodiment 8: The method of any of embodiments 1 to 7 further comprising: reporting (800), to a network node, a capability signaling on the maximum number of CORESETs per 'PDCCH-config'.

Embodiment 9: The method of embodiment 8 wherein reporting the capability signaling further comprises indicating a maximum number of CORESETs per 'PDCCH-config' as well as the corresponding number of BWPs.

Embodiment 10: The method of any of embodiments 1 to 9 further comprising: receiving (802) a configuration with multiple CORESETs per serving cell taking into account one or more lists of TCI states.

Embodiment 11: The method of embodiment 10 wherein receiving the configuration further comprises receiving the configuration with multiple CORESETs per serving cell taking into account the reported capability signaling and the one or more lists of TCI states.

Embodiment 12: The method of any of embodiments 1 to 17 further comprising: receiving (804) a configuration with a higher layer index per CORESET used for forming one or more CORESET groups.

Embodiment 13: The method of any of embodiments 1 to 12 wherein the wireless device is configured to receive multiple PDCCH in a given slot.

Embodiment 14: The method of any of embodiments 1 to 13 wherein the maximum number of CORESETs per "PDCCH-config" is five or more.

Embodiment 15: The method of any of embodiments 1 to 14 wherein the maximum number of BWPs per serving cell is four or more.

Embodiment 16: The method of any of the previous embodiments, further comprising: providing user data; and forwarding the user data to a host computer via the transmission to the base station.

Group B Embodiments

Embodiment 17: A method performed by a base station for determining one or more Transmission Configuration Indicator, TCI, states, the method comprising: receiving (906), from a wireless device, an indication of a TCI state for at least one Control Resource Set, CORESET, using a control message comprising one of: i. four bits of CORESET ID field; and ii. five or more bits of CORESET ID field.

Embodiment 18: The method of embodiment 17 wherein the control message is a Medium Access Control, MAC, Control Element, CE.

Embodiment 19: The method of any of embodiments 17 to 18 wherein, when the control message comprises four bits of CORESET ID field, the CORESET ID field is reinterpreted when one or multiple CORESET groups are configured.

Embodiment 20: The method of any of embodiments 17 to 19 wherein the CORESET ID indicated in the control message with value m is reinterpreted as the $m^{th}$ CORESET within the CORESET group as configured in Radio Resource Control, RRC.

Embodiment 21: The method of any of embodiments 17 to 20 wherein the CORESET group is known as the group of the CORESET that carries the Physical Downlink Control Channel, PDCCH, which is used to schedule the Physical Downlink Shared Channel, PDSCH, carrying the TCI state indication control message.

Embodiment 22: The method of any of embodiments 17 to 18 wherein when the control message comprises four bits of CORESET ID field, the maximum number of CORESETs per serving cell is limited to Embodiment 16:

Embodiment 23: The method of embodiment 22 wherein the maximum number of CORESETs per serving cell is limited via wireless device capability signaling.

Embodiment 24: The method of any of embodiments 17 to 23 further comprising: receiving (900), from the wireless device, a capability signaling on the maximum number of CORESETs per 'PDCCH-config'.

Embodiment 25: The method of embodiment 24 wherein receiving the capability signaling further comprises receiving a maximum number of CORESETs per 'PDCCH-config' as well as the corresponding number of BWPs.

Embodiment 26: The method of any of embodiments 17 to 25 further comprising: transmitting (902), to the wireless device, a configuration with multiple CORESETs per serving cell taking into account one or more lists of TCI states.

Embodiment 27: The method of embodiment 26 wherein transmitting the configuration further comprises transmitting the configuration with multiple CORESETs per serving cell taking into account the reported capability signaling and the one or more lists of TCI states.

Embodiment 28: The method of any of embodiments 17 to 27 further comprising: transmitting (904), to the wireless device, a configuration with a higher layer index per CORESET used for forming one or more CORESET groups.

Embodiment 29: The method of any of embodiments 17 to 28 wherein the wireless device is configured to receive multiple PDCCH in a given slot.

Embodiment 30: The method of any of embodiments 17 to 29 wherein the maximum number of CORESETs per "PDCCH-config" is five or more.

Embodiment 31: The method of any of embodiments 17 to 30 wherein the maximum number of BWPs per serving cell is four or more.

Embodiment 32: The method of any of the previous embodiments, further comprising: obtaining user data; and forwarding the user data to a host computer or a wireless device.

Group C Embodiments

Embodiment 33: A wireless device for indicating one or more Transmission Configuration Indicator, TCI, states, the wireless device comprising: processing circuitry configured to perform any of the steps of any of the Group A embodiments; and power supply circuitry configured to supply power to the wireless device.

Embodiment 34: A base station for determining one or more Transmission Configuration Indicator, TCI, states, the base station comprising: processing circuitry configured to perform any of the steps of any of the Group B embodiments; and power supply circuitry configured to supply power to the base station.

Embodiment 35: A User Equipment, UE, for indicating one or more Transmission Configuration Indicator, TCI, states, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 36: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 37: The communication system of the previous embodiment further including the base station.

Embodiment 38: The communication system of the previous 2 embodiments, further including the UE, wherein the UE is configured to communicate with the base station.

Embodiment 39: The communication system of the previous 3 embodiments, wherein: the processing circuitry of the host computer is configured to execute a host application, thereby providing the user data; and the UE comprises processing circuitry configured to execute a client application associated with the host application.

Embodiment 40: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 41: The method of the previous embodiment, further comprising, at the base station, transmitting the user data.

Embodiment 42: The method of the previous 2 embodiments, wherein the user data is provided at the host computer by executing a host application, the method further comprising, at the UE, executing a client application associated with the host application.

Embodiment 43: A User Equipment, UE, configured to communicate with a base station, the UE comprising a radio interface and processing circuitry configured to perform the method of the previous 3 embodiments.

Embodiment 44: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 45: The communication system of the previous embodiment, wherein the cellular network further includes a base station configured to communicate with the UE.

Embodiment 46: The communication system of the previous 2 embodiments, wherein: the processing circuitry of the host computer is configured to execute a host application, thereby providing the user data; and the UE's processing circuitry is configured to execute a client application associated with the host application.

Embodiment 47: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 48: The method of the previous embodiment, further comprising at the UE, receiving the user data from the base station.

Embodiment 49: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 50: The communication system of the previous embodiment, further including the UE.

Embodiment 51: The communication system of the previous 2 embodiments, further including the base station, wherein the base station comprises a radio interface configured to communicate with the UE and a communication interface configured to forward to the host computer the user data carried by a transmission from the UE to the base station.

Embodiment 52: The communication system of the previous 3 embodiments, wherein: the processing circuitry of the host computer is configured to execute a host application; and the UE's processing circuitry is configured to execute a client application associated with the host application, thereby providing the user data.

Embodiment 53: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 54: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 55: The method of the previous embodiment, further comprising, at the UE, providing the user data to the base station.

Embodiment 56: The method of the previous 2 embodiments, further comprising: at the UE, executing a client application, thereby providing the user data to be transmitted; and at the host computer, executing a host application associated with the client application.

Embodiment 57: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 58: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 59: The communication system of the previous embodiment further including the base station.

Embodiment 60: The communication system of the previous 2 embodiments, further including the UE, wherein the UE is configured to communicate with the base station.

Embodiment 61: The communication system of the previous 3 embodiments, wherein: the processing circuitry of the host computer is configured to execute a host application; and the UE is configured to execute a client application associated with the host application, thereby providing the user data to be received by the host computer.

Embodiment 62: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 63: The method of the previous embodiment, further comprising at the base station, receiving the user data from the UE.

Embodiment 64: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CE Control Element
CORESET Control Resource Set
CP Cyclic Prefix
CP-OFDM CP-Orthogonal Frequency Division Multiplexing
CPU Central Processing Unit
CRB Common Resource Block
CSI Channel State Information
CSI-RS Channel State Information Reference Signal
DCI Downlink Channel information
DFT Discrete Fourier Transform
DFT-S-OFDM DFT Spread Orthogonal Frequency Division Multiplexing
DL Downlink
DMRS Demodulation Reference Signal
DN Data Network
DSP Digital Signal Processor
eNB Enhanced or Evolved Node B
FFS For Further Study
FPGA Field Programmable Gate Array
FR Frequency Range
gNB New Radio Base Station gNB-CU New Radio Base Station Central Unit
gNB-DU New Radio Base Station Distributed Unit
HSS Home Subscriber Server
ID Identification
IoT Internet of Things
IP Internet Protocol
LCID Logical Channel ID
LTE Long Term Evolution
MAC Medium Access Control
MIMO Multiple Input Multiple Output
MME Mobility Management Entity
MTC Machine Type Communication
NC-JT Non-Coherent Joint Transmission
NEF Network Exposure Function
NF Network Function
NR New Radio
NRF Network Function Repository Function
NSSF Network Slice Selection Function
OTT Over-the-Top
PC Personal Computer
PCF Policy Control Function
PDCCH Physical Downlink Control Channel
PDCH Physical Data Channel
PDSCH Physical Downlink Shared Channel
P-GW Packet Data Network Gateway
PUSCH Physical Uplink Shared Channel
QCL Quasi Co-Located
RAM Random Access Memory
RAN Radio Access Network
RB Resource Block
RE Resource Element
ROM Read Only Memory
RRH Remote Radio Head
RRC Radio Resource Control
RS Reference Signal
RTT Round Trip Time
SCEF Service Capability Exposure Function
SINR Signal to Interference Plus Noise Ratio
SMF Session Management Function
TCI Transmission Configuration Indicator
TRP Transmission Reception Point
TRS Tracking CSI Reference Signal
TS Technical Specification
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for receiving one or more Transmission Configuration Indicator, TCI, states, the method comprising:

receiving a TCI state for at least one Control Resource Set, CORESET, using a control message comprising a TCI State Identification, ID, field, wherein the TCI State ID field is at least eight bits; and updating the TCI state for the at least one CORESET;

wherein the control message is a Medium Access Control, (MAC), Control Element, (CE); wherein the MAC CE control message comprises three octets, wherein the TCI State ID is provided in a third octet of the control message.

2. The method of claim 1 wherein the control message further comprises a CORESET ID, where the CORESET ID indicated in the control message with value m is reinterpreted as an m$^{th}$ CORESET within a CORESET group as configured in Radio Resource Control, RRC.

3. The method of claim 1 wherein the CORESET group is known to the wireless device as the group of the CORE-SET that carries a Physical Downlink Control Channel, PDCCH, which is used to schedule a Physical Downlink Shared Channel, PDSCH, carrying the TCI state indication control message.

4. The method of claim 1 wherein a CORESET ID field comprises one of the group consisting of: four bits; and five or more bits.

5. The method of claim 4 wherein a maximum number of CORESETs per serving cell is limited via wireless device capability signaling.

6. The method of claim 1 further comprising:

reporting, to a network node, a capability signaling on a maximum number of CORESETs per Bandwidth part, BWP and/or per 'PDCCH-config'.

7. The method of claim 6 wherein reporting the capability signaling further comprises indicating a maximum number of CORESETs per 'PDCCH-config' as well as a corresponding number of Bandwidth Parts, BWPs.

8. The method of claim 1 further comprising:

receiving a configuration with multiple CORESETs per serving cell taking into account one or more lists of TCI states.

9. The method of claim 8 wherein receiving the configuration with multiple CORESETs per serving cell further comprises receiving the configuration with multiple CORE-SETs per serving cell taking into account the reported capability signaling and the one or more lists of TCI states.

10. The method of claim 1 further comprising:

receiving a configuration with a higher layer index per CORESET used for forming one or more CORESET groups.

11. The method of claim 1 wherein the wireless device is configured to receive multiple PDCCHs in a given slot.

12. The method of claim 1 wherein the maximum number of CORESETs per Bandwidth Part, BWP, and/or per "PDCCH-config" is five or more.

13. A method performed by a base station for determining one or more Transmission Configuration Indicator, TCI, states, the method comprising:

transmitting, to a wireless device, an indication of a TCI state for at least one Control Resource Set, CORESET, using a control message comprising a TCI State Identification, ID, field, wherein the TCI State ID field is at least eight bits, wherein the control message is a Medium Access Control, (MAC), Control Element, (CE); wherein the MAC CE control message comprises three octets, and wherein the TCI State ID is provided in a third octet of the control message.

14. A wireless device for receiving one or more Transmission Configuration Indicator, TCI, states, the wireless device comprising:

one or more processors; and memory storing instructions executable by the one or more processors, whereby the wireless device is operable to:

receive a TCI state for at least one Control Resource Set, CORESET, using a control message comprising a TCI State Identification, ID, field, wherein the TCI State ID field is at least eight bits, wherein the control message is a Medium Access Control, (MAC), Control Element, (CE), wherein the MAC CE control message comprises three octets, and wherein the TCI State ID is provided in a third octet of the control message.

15. A base station for transmitting one or more Transmission Configuration Indicator, TCI, states, the base station comprising:

one or more processors; and memory comprising instructions to cause the base station to:

transmit, to a wireless device, an indication of a TCI state for at least one Control Resource Set, CORESET, using a control message comprising a TCI State Identification ID field, wherein the TCI State ID field is at least eight bits, wherein the control message is a Medium Access Control, (MAC), Control Element, (CE), wherein the MAC CE control message comprises three octets, and wherein the TCI State ID is provided in a third octet of the control message.

* * * * *